(12) United States Patent
Soltvedt (10) Patent No.: US 8,689,893 B2
(45) Date of Patent: Apr. 8, 2014

(54) CHECK VALVE

(75) Inventor: Terje Morten Soltvedt, Sandnes (NO)

(73) Assignee: TS Innovation AS, Sandnes (NO)

( * ) Notice: Subject to any disclaimer, the term of this patent is extended or adjusted under 35 U.S.C. 154(b) by 0 days.

(21) Appl. No.: 13/981,582

(22) PCT Filed: Jan. 25, 2012

(86) PCT No.: PCT/NO2012/000009
§ 371 (c)(1),
(2), (4) Date: Jul. 24, 2013

(87) PCT Pub. No.: WO2012/102620
PCT Pub. Date: Aug. 2, 2012

(65) Prior Publication Data
US 2013/0299162 A1 Nov. 14, 2013

(30) Foreign Application Priority Data
Jan. 25, 2011 (NO) .................................... 20110108

(51) Int. Cl.
*E21B 34/02* (2006.01)
(52) U.S. Cl.
USPC ....................................... 166/386; 166/332.8
(58) Field of Classification Search
USPC ............................. 166/383, 386, 325, 332.8
See application file for complete search history.

(56) References Cited

U.S. PATENT DOCUMENTS

| 2,780,290 A | 2/1957 | Natho |
| 4,376,464 A * | 3/1983 | Crow ............................ 166/324 |
| RE32,390 E * | 4/1987 | Pringle ......................... 166/321 |
| 4,907,650 A | 3/1990 | Heinonen |
| 6,227,299 B1 * | 5/2001 | Dennistoun ................. 166/332.8 |
| 2012/0043092 A1 * | 2/2012 | Arizmendi et al. ........... 166/369 |

FOREIGN PATENT DOCUMENTS

EP 0985798 3/2000

OTHER PUBLICATIONS

International Preliminary Report on Patentability mailed Mar. 4, 2013 which issued in corresponding International Patent Application No. PCT/NO2012/000009 (5 pages).
International Preliminary Report on Patentability mailed Oct. 19, 2013 which issued in corresponding International Patent Application No. PCT/NO2012/000009 (2 pages).
Norwegian Search Report mailed Aug. 19, 2011 which issued in corresponding Norwegian Patent Application No. 20110108 (2 pages).

* cited by examiner

*Primary Examiner* — William P Neuder
(74) *Attorney, Agent, or Firm* — Nixon Peabody LLP (57) ABSTRACT

The present invention provides a check valve comprising a valve housing (1,2), a substantially circular flapper (3), a valve seat (16) for the flapper (3), an expandable chamber (11) in fluid contact with a connecting port (8) for hydraulics fluid, and a piston (4) having a first and a second end, the flapper comprises a first (19) and a second (18) connection point and is pivotably connected at the first connection point (19), said flapper is capable of pivoting between a closed position in close contact with the valve seat (16) and an open position which allows fluid to flow through the valve, the piston (4) is in contact with the expandable chamber (11) and a pre-stressed compressible device (15), said piston (4) pivotably connected at the first end to the flapper (3) via the second connection point and that the second connection point (18) is situated closer to the center of the circular part of the flapper than the first connection point (19).

17 Claims, 8 Drawing Sheets

Fig. 5 Cross-Section C-C

Fig. 6 Cross-Section D-D

CHECK VALVE

CROSS-REFERENCE TO RELATED APPLICATIONS

This application is a U.S. national stage of International Patent Application No. PCT/NO2012/000009, filed Jan. 25, 2012 which claims priority to Norwegian Patent Application No. 20110108, filed Jan. 25, 2011, the contents of which are incorporated herein by reference in its entirety.

TECHNICAL FIELD

The present invention concerns a check valve which is remotely controlled by hydraulics, the use of such in well testing, and a method for the testing of test tubing strings by use of said check valve.

BACKGROUND OF THE INVENTION

According to the Norsok-requirements (D-SR-007), which are set in connection with well testing, it is required to have a check valve installed in between the kill valve on the surface test tree and the cement unit of the rig.

The reason for the requirement of a check valve is as follows; if the well has to be killed during the test-operation, the kill valve on the surface test tree must be opened so that well-killing mud can be pumped from the cement unit through the kill valve and down into the well. The moment the kill valve is opened, said check valve will prevent hydrocarbons from flowing down towards the cement unit. It is extremely dangerous to get hydrocarbons, in the form of gas, into a cement unit.

Said check valve, commonly a flapper valve, has until now had a manual mechanical override function. A threaded steel rod is screwed into the valve housing and pushes the flapper off the valve seat and leaves a passage through which the fluid can be pumped or bled off.

The override function is necessary to allow for pressure testing, and accompanying bleeding of the test tube string, according to programs and procedures for testing of wells.

When the test tubing string has been verified as being good, the following operation is to perforate the well and to subsequently flow hydrocarbons to the surface.

However, before the test tubing string is set under pressure, the manual mechanical override function must be disengaged so that the check valve is operating as intended, in other words preventing back flow from the test tubing string to the cement unit. Disengagement of the override function is obtained by screwing the above mentioned steel rod out of position and off the flapper element, thereby allowing the flapper to seal against the valve seat.

The check valve is barrier number two, after the kill valve, on the surface test tree, i.e. the check valve shall function as a barrier against the cement unit in the case of the kill valve not being able to keep itself sealed, see the explanation above. Thus, from this point in the operation program, the mechanical override function is not to be in operation.

In order to disengage this mechanical override function, personnel must move up in the ride belt and manually disengage the function by using a threaded rod and a wrench.

Thus, this operation requires personnel to walk in the ride belt and to work within the so-called defined red zone. In principle one is not allowed to plan for operations in the red zone. However, at the present it is not possible to avoid this operation. Accordingly, such operations require an internal deviation from standard every time it is to be performed. It is always a risk of falling objects when work is performed in the ride belt, and if the sea in addition is rough it is a dangerous operation. It requires approximately 30 minutes of operational time each time the override function of this check valve is to be disengaged or engaged.

As described, the present solution for a check valve in the surface test tree leads to an increased risk for the operational personnel who are required to move around in the ride belt in order to disengage or engage the override function of the check valve. In addition, such a manual function leads to a long operational time; approximately 30 minutes each time the override function is disengaged or engaged. In this time period other operations must be set on hold while personnel are present in the red zone.

A further problem with the present check valves is leakage through the check valve when there is zero or low pressure on the well side.

Thus, in the presently known technique there exists a pressing need for a solution which can both reduce the risk towards operation personnel, and shorten the operational time, in connection with the disengagement and engagement of the override function of the check valve installed in between the kill valve and the cement unit of a surface test tree. In addition, it is desirable to minimize or remove leakage in connection with zero or low pressure on the well side of the valve.

At the present there are no check valves having a hydraulic override and which are suitable for the use described above. In the literature, a number of check valves for use in for example drill strings are described. However, these valves do not fulfill the necessary requirements concerning size (short length) and adequate sealing of the valve at low/zero pressure on the well side. Common features of check valves suitable for use in drill strings are that they do not have any restrictions regarding their length, and that they are designed primarily to be in an open position.

EP 0985798 describes a check valve suitable for use in a drill string. This valve is intended to be open during a normal operation, and is being closed in the case of for instance a blowout. In order to obtain a proper sealing, the valve is dependent on an adequate amount of excess pressure on the well side to push the flapper against the valve seat. The design of the power transfer from the hydraulic/spring-system is not suited to provide an even and sufficiently high pressure on the flapper such that the valve is tightly closed without the help of excess pressure on the well side. Further, said hydraulic/spring-system is not suited to fulfill the requirements of a maximum length of the valve if it were to be used on for instance a surface test tree.

U.S. Pat. No. 2,780,290 describes a check valve suited for use in a drill string. This valve is intended to be open during normal operations, and is closed in the case of for instance a blowout. The valve is not suited to fulfill the requirement of a maximum length if it were to be used on for instance a surface test tree.

SUMMARY OF THE INVENTION

The present invention provides a hydraulically overrideable check valve especially suited for application on the kill side of a surface test tree, the use of a hydraulically overrideable check valve on the kill side of a test tree and a method for pressure testing a well testing string. The invention is further defined by the following:

A check valve comprising a valve housing, a substantially circular flapper, a valve seat for the flapper, an expandable chamber in fluid contact with a connecting port for hydraulics fluid, and a piston, the flapper comprises a first and a second connection point and is pivotably connected at the first connection point and capable of pivoting between a closed position in close contact with the valve seat and an open position which allows fluid to flow through the valve, the piston is in contact with the chamber and a prestressed compressible device such that the compressible device pushes the piston in a direction towards the valve seat, and the hydraulic fluid pushes the piston in a direction away from the valve seat when sufficient hydraulics fluid is supplied through the connection port, at one end the piston is pivotably connected to the flapper via the second connection point, the second connection point is situated closer than the first connection point to the center of the circular part of the flapper, such that the flapper comes into close contact with the valve seat when the piston is pushed in a direction towards said valve seat, and the flapper will pivot around the first connection point in a direction towards the piston when the piston is pushed in a direction away from the valve seat.

In one embodiment, the piston is pivotably connected to the flapper by an arm, said arm is pivotably connected to the flapper at the second connection point.

In one embodiment, the compressible device is a spring or a gas-filled chamber.

In one embodiment, a section of the side wall of the piston constitutes a part of the expandable chamber.

In one embodiment, the valve seat is exchangeable.

In one embodiment, the flapper is pivotably connected at the first connection point by a shaft.

In one embodiment, the valve housing comprises a first and a second element connected together, each element comprises two ends wherein one of these two ends has a function suitable for joining the two elements together, said function is preferably threads, and the second ends of the elements comprise a flange.

The check valve may also comprise a hollow cylinder which can be guided through the valve with the intention of protecting the flapper, joints and piston, i.e. the mechanism inside the valve. This will first of all be relevant when the valve is used in gravel packing operations.

In one aspect of the invention a hydraulically overrideable check valve is used in between a flow valve and a cementing unit on a surface test tree. A check valve according to the present invention is a preferred valve for such use.

Another aspect of the invention concerns a method for pressure testing of a well testing string, comprising the following steps:
  overriding a check valve (7a), installed in between a flow valve (4a) and a cementing unit (8a) on a surface test tree, by providing hydraulic pressure to said check valve (7a) through a hydraulic tubing (9a);
  pressure testing the well testing string; and
  disengaging the override of the check valve (7a) by removing the hydraulic pressure.

At the second ends of the valve housing elements, a flange may be present, but other connection devices may also be used. By using connection devices other than flanges, the valve may be used in various applications. By designing the valve with "Weco"-couplings it may for instance be used in single operations offshore or on land-based assignments. In these cases, it will be used as a safety valve.

The check valve according to the invention may also replace a so-called "Surface Safety"-valve which presently is used during well testing. It is a valve which shall prevent back-flow from the processing plant in the event that a flexible production tubing ruptures on the rig floor. In such a case, the valve will be connected to an electronic shut-down system. A signal from this system will release the hydraulic pressure of the control-line and allow the flapper to close. A risk assessment indicates that this novel valve is better suited than the presently used seat/sleeve valves (Gate and Seat). The advantage of using this novel flapper valve is that no pressure is kept in between the surface test tree and the well head control manifold. Present valves close up this pressure which leads to the valves having to open with a very high differential pressure. This causes a high degree of wear on the valve with danger of subsequent leakage and down-time. It also causes a high risk of hydrate formation, which in turn is highly dangerous.

The valve according to the present invention may also be constructed in exotic material such that it may be installed on well heads situated on the sea bed.

DETAILED DESCRIPTION OF THE INVENTION

Figure 1:
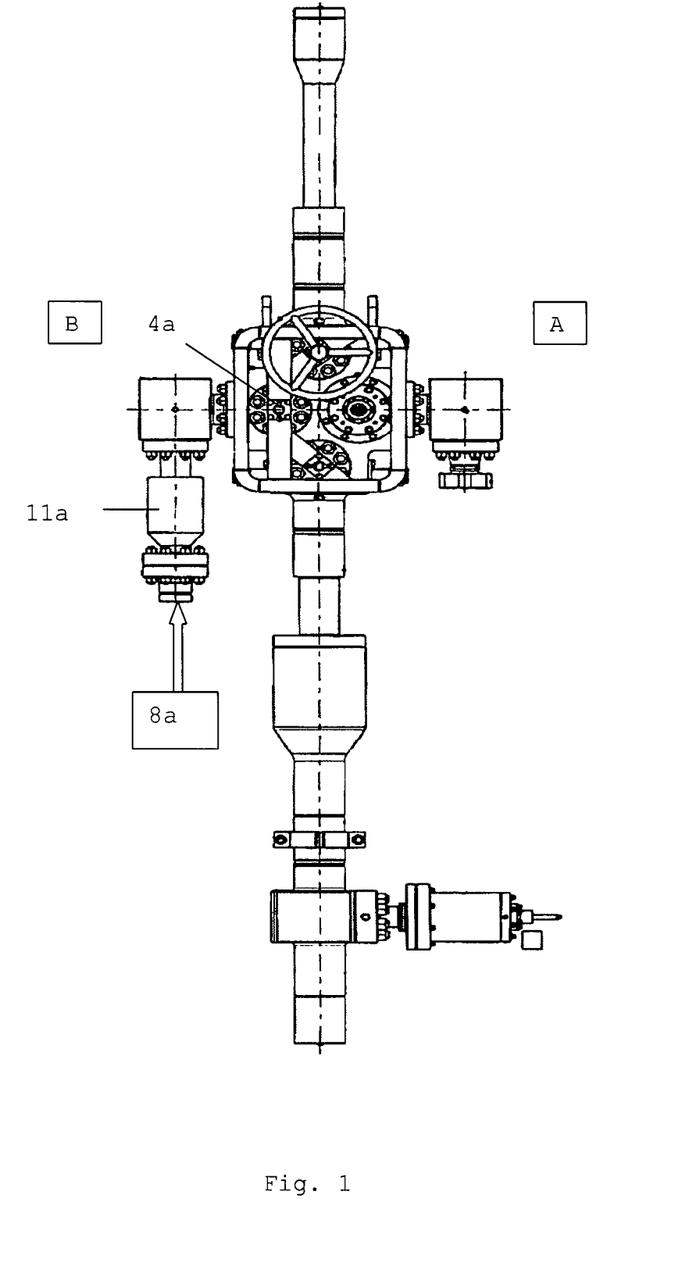
FIG. 1: shows a typical surface test tree with a manually operated check valve on the kill side.

A surface test tree is used in the testing of oil and gas wells. FIG. 1 shows a typical test tree for installation on a well head. The test tree comprises a production or flow side A and a kill side B. On the kill side, a check valve 11a is installed in between the flow valve 4a and a cementing unit 8a for pumping kill fluid. In order to override the check valves which are presently in use, for instance in connection with pressure testing of a well testing string, a person must move up into the ride belt and do this by the help of a manual override mechanism. To avoid this time demanding and costly operation, the present invention provides a novel hydraulically overrideable check valve, the use of hydraulically overrideable check valves in the operation described above, and a method for overriding a check valve.

Figure 2:
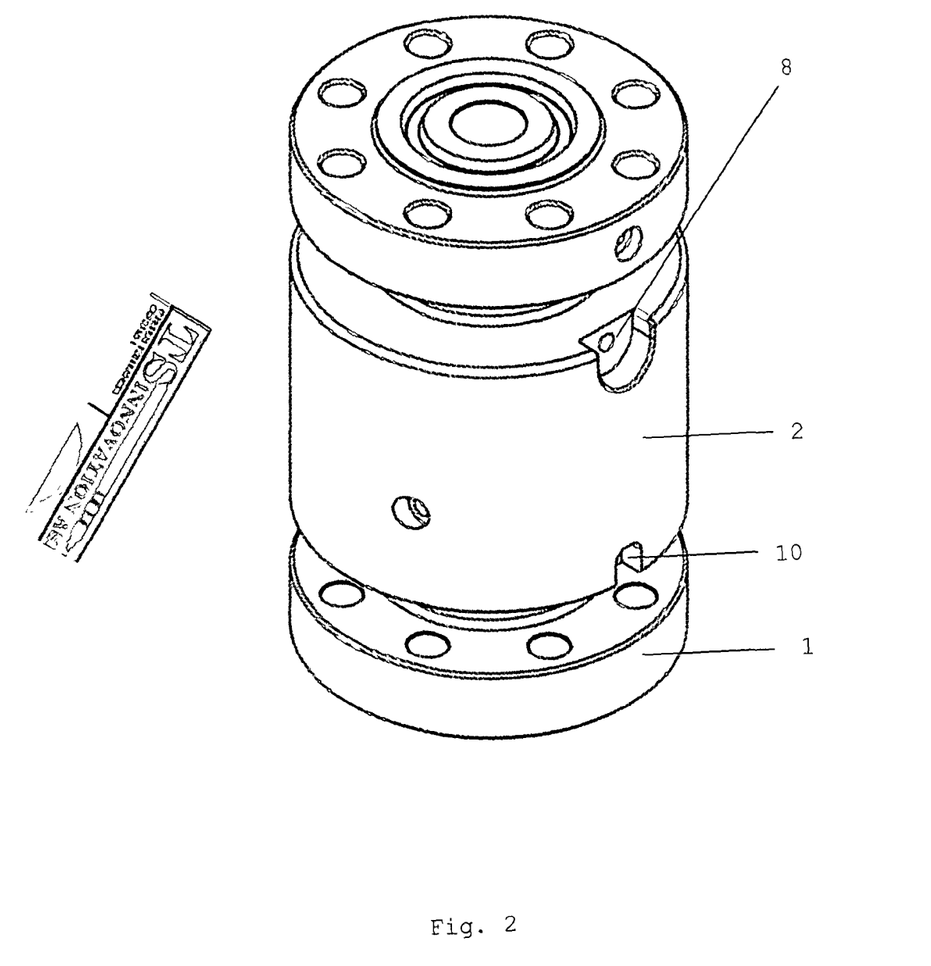
FIG. 2: shows an isometric drawing of a check valve according to the invention.

In FIG. 2, an embodiment of a check valve according to the present invention is shown from the side. The valve housing comprises two separate elements, male-flange 1 and female-flange 2. In this embodiment, the elements 1 and 2 are mounted together by using 8×8 Stub Acme threads with sealing by an O-ring. A locking screw 10 (type M10) is used to prevent the elements 1 and 2 from moving during operation, the elements are thereby locked against each other. This method of coupling the elements together simplifies the maintenance since the valve does not require machine assisted high torque tightening. Male-flange 1 is the inflow section of the valve, and the fluid flow will normally arrive from this side of the valve. Embodiments having a reverse configuration, wherein the inflow section is designed as a female-flange is also possible.

Figure 3:
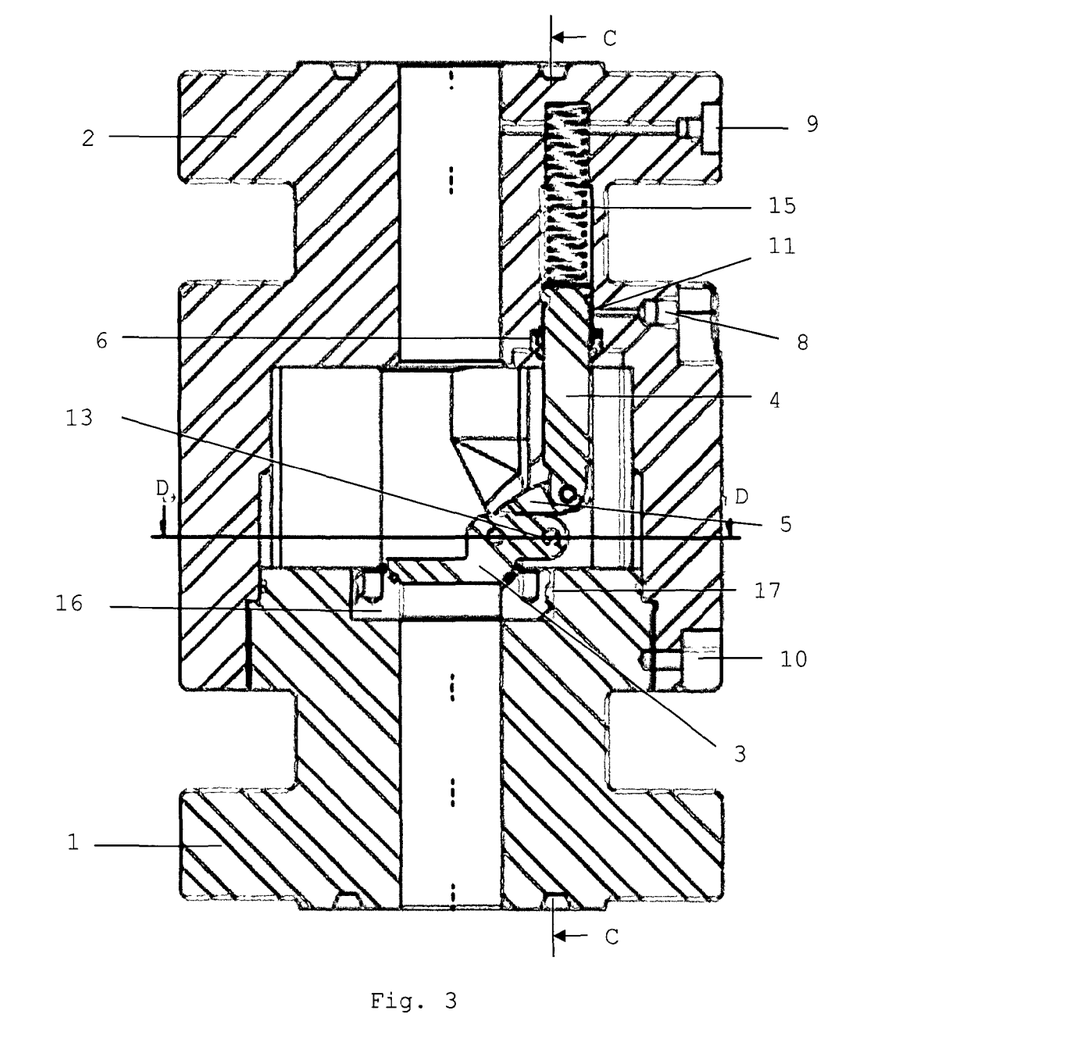
FIG. 3: shows a cross section of the check valve in FIG. 2, with the flapper in a closed position.

The kill tubing of the rig is coupled to the inflow section of the valve, such that the fluid passes through the flapper 3, FIG. 3, as planned without hydraulic pressure being provided via a control line coupled to the connection point/port 8 (¼" BSP).

The male-flange 1 also comprises a valve seat 16. In this particular embodiment, a releasable seat inset is chosen to facilitate future maintenance, and to reduce maintenance expenses. Further, there is an O-ring sealing 17 in between the valve seat 16 and male-flange 1. This O-ring is a point of leakage if it should fail. However, the leakage would be internal and will not affect outer conditions or the mode of operation. The contact surface of the male-flange 1, the site where the O-ring seals, may preferably be coated by Inconell. This reduces the danger of corrosion and pittings caused by corrosive well fluid or chemicals.

The female-flange 2 is the second main element from which the valve is constructed, FIG. 3. This element contains a flapper 3, right flapper box 7 and left flapper box 12. The flapper boxes 7 and 12 forms the box in which the flapper 3 operates. The flapper 3 is coupled via an arm 5 to the piston 4. A pre-stressed spring 15 is situated in the rear of, and in contact with, the upper part of the piston 4. There is a recess below the pistons upper section, in between the piston and the valve housing. The recess forms part of a chamber 11 which expands when provided with hydraulic pressure. A gasket box 6 forms a seal between the well fluid and the hydraulically supplied fluid. In this embodiment, an exchangeable gasket box 6 is chosen to simplify future maintenance and reduce the cost of said maintenance. The lower part of the piston 4 is pivotably connected together with one end of the arm 5. The second end of the arm 5 is pivotably connected to the flapper 3 at the connection point 18. In this example, the flapper comprises a flapper arm having two connection points 18, 19 which is used for the coupling of the flapper to the arm 5 and the shaft 13.

Addition of hydraulic pressure from a separate control panel is done through a ¼" BSP connection point/port 8.

Figure 4:
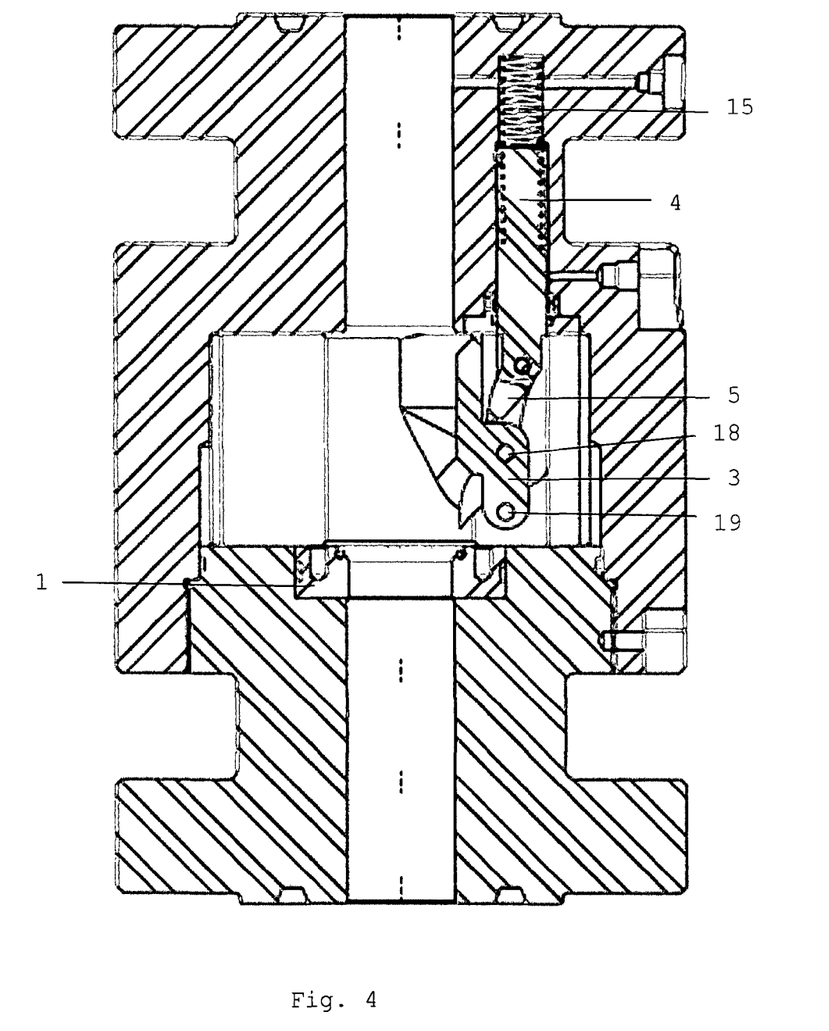
FIG. 4: shows a cross section of the check valve in FIG. 2, with the flapper in an open position.

When hydraulic fluid is supplied via connection point/port 8, the piston 4 is driven backwards towards the pre-stressing spring 15 and compresses said spring. Added hydraulic fluid pressure exceeds the pre-stress force of the spring 15. When said pressurizing is performed, the flapper 3 is moved from the normally closed position, FIG. 3, to a hydraulically kept open position, FIG. 4. That is, the piston 4 pulls, via arm 5, the flapper 3 up and into an open position. This position is kept as long as hydraulic pressure is supplied.

The pressure-equalizing channel 9 (⅛" BSP) ensures that the same pressure is maintained in the spring housing as in the front of gasket box 6. This pressure equalizing is required to maintain the functionality of the valve.

When the hydraulic pressure is released, the pre-stressing spring expands 15 and drives the hydraulic fluid out of the valve via connection point/port 8 and back to the control panel. When the expanding pre-stressing spring 15 drives the piston 4 back, arm 5 is moved and pushes the flapper 3 onto the valve seat 16.

The flapper 3 is pushed against the valve seat 16 by the pre-stressing spring 15 using a force of approximately 10 kilos.

In this manner a complete sealing against the vale seat 16 is achieved without requiring that the flapper 3 needs to be "set/helped" onto the valve seat 16 by the help of fluid pressure from the well. This prevents leakage through the check valve in the event of low pressure on the well side. The location of the connection point 18 close to the center of the flapper assists in achieving a uniform pressure on the flapper and thus an improved sealing against the valve seat 16.

Figure 5:
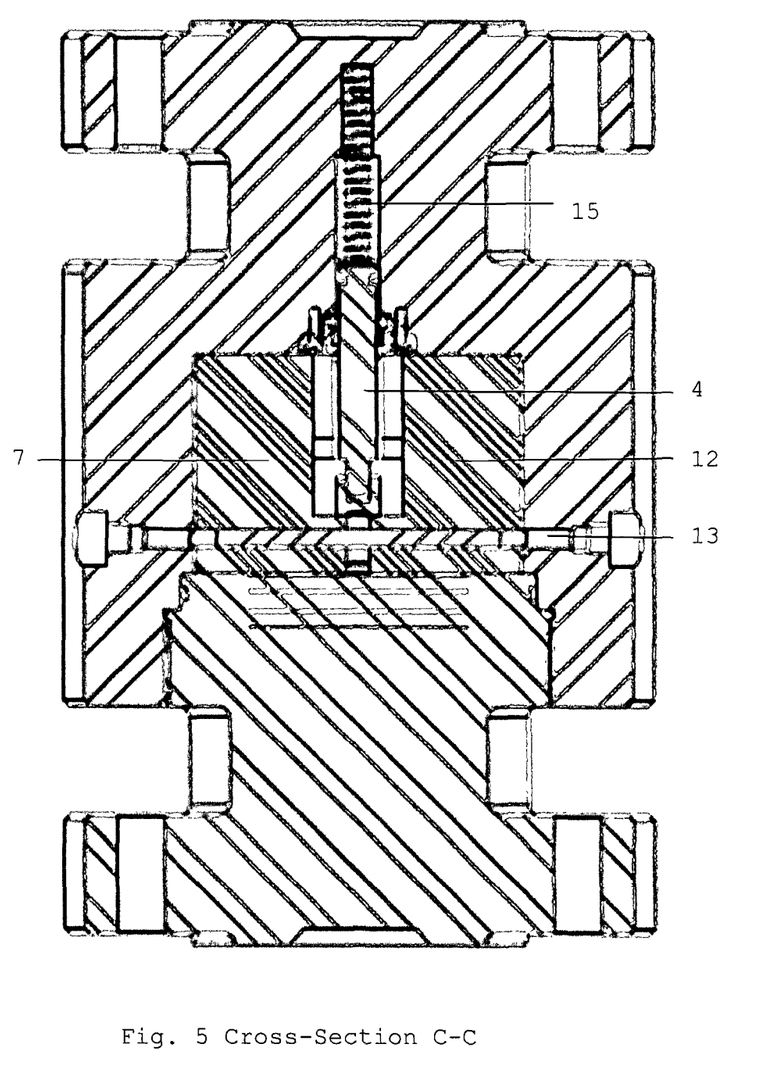
FIG. 5: shows section C-C in FIG. 3.
Figure 6:
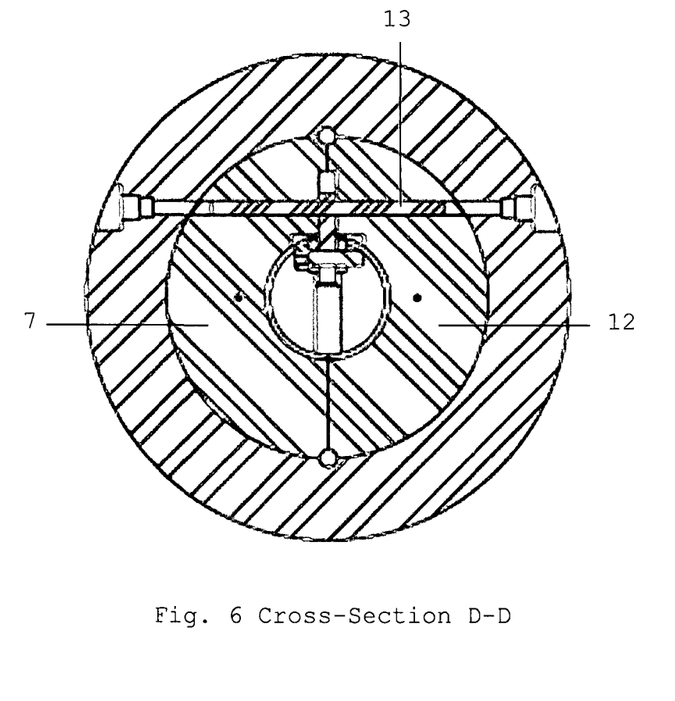
FIG. 6: shows section D-D in FIG. 3.

The flapper 3 itself is supported by a shaft bolt 13 going through the flapper, se FIGS. 5 and 6. O-rings seal around the shaft bolt 13, in addition to two ¼" BSP seal plugs.

Figure 7:
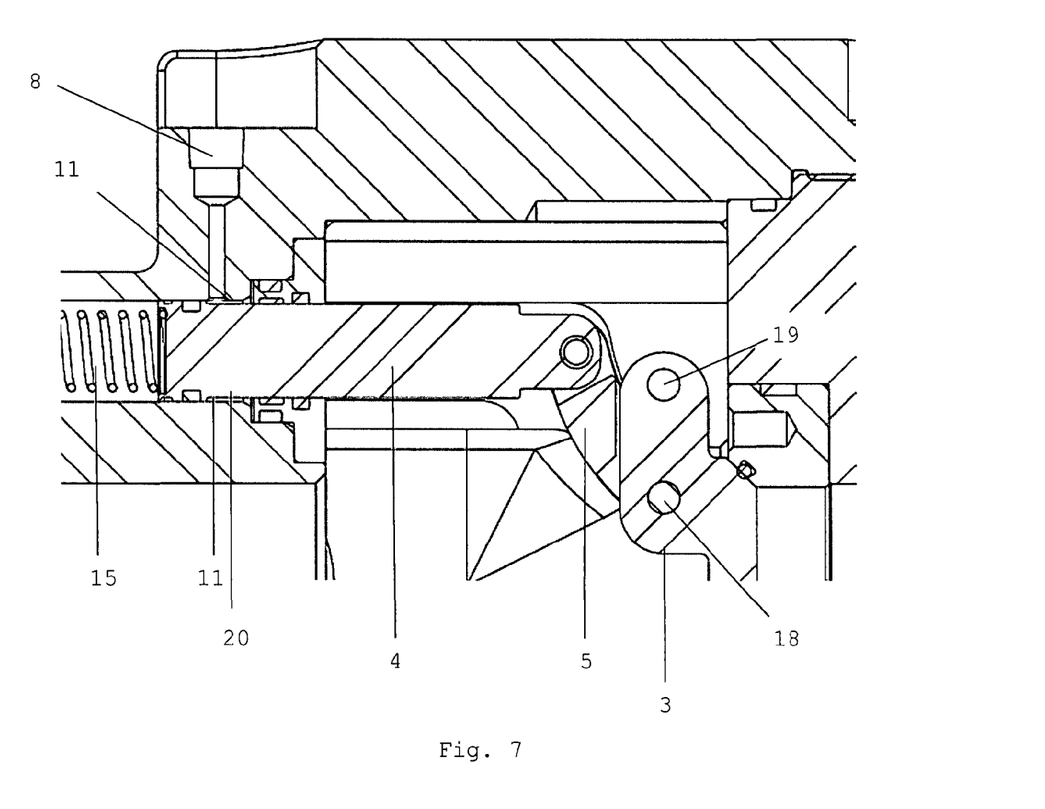
FIG. 7: shows a magnified section of the override mechanism of the check valve shown in FIGS. 3 and 4.

FIG. 7 shows a magnified cross section of the hydraulic override mechanism.

Figure 8:
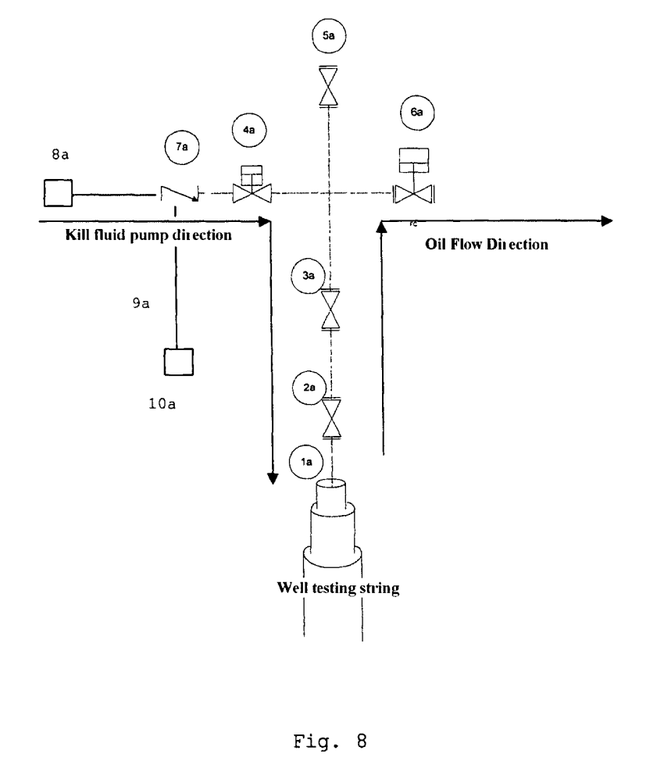
FIG. 8: shows a flow chart for a surface test tree.

FIG. 8 shows a flow chart of a surface test tree, wherein a hydraulically overrideable check valve 7a is installed in between a flow valve 4a on the kill side of the test tree and the cementing unit of the rig 8a. Further, the flow chart shows a flow valve 6a on the production/flow side, upper 3a and lower 2a well valve, crown valve 5a, well testing string 1a, hydraulic tubing 9a and a control panel 10a for controlling the hydraulics. The present invention provides a method for the verification of a well testing string comprising the following steps:

Overriding a check valve 7a, installed in between a flow valve 4a and a cementing unit 8a on a surface test tree, by providing hydraulic pressure to said check valve 4a through a hydraulic tubing 9a.

Pressure testing the well testing string; and

Disengaging the override of the check valve 7a by removing the hydraulic pressure.

By using the above mentioned method according to the present invention, the operation time can be reduced from 30 min. to at most 3-4 min. It should also be noted that the check valve 7a in this case can be managed/used in parallel with other types of operations, i.e. rig time is no longer used. The financial consequences of such a method will be in the range of 125000, -to 165000, -NOK each time the check valve is used.

The invention claimed is:

1. A check valve comprising a valve housing, a substantially circular flapper, a valve seat for the flapper, an expandable chamber in fluid contact with a connecting port for hydraulics fluid, and a piston having a first and a second end, wherein the flapper comprises a first and a second connection point and is pivotally connected at the first connection point, said flapper being capable of pivoting between a closed position in close contact with the valve seat and an open position which allows fluid to flow through the valve, and wherein the piston is in contact with the expandable chamber and a pre-stressed compressible device, said piston being pivotally connected at the first end to the flapper via the second connection point, characterized in that the compressible device can move the piston in a direction towards the valve seat, that hydraulic fluid can move the piston in a direction away from the valve seat when sufficient hydraulic fluid is supplied through the connection port to expand the chamber, and that the second connection point is situated closer to the center of the circular part of the flapper than the first connection point, such that the flapper comes into close contact with the valve seat when the piston is moved in a direction towards said valve seat and the flapper will pivot around the first connection point in a direction towards the piston when the piston is moved in a direction away from the valve seat.

2. A check valve according to claim 1, wherein the piston is pivotally connected to the flapper by an arm, said arm being pivotally connected to the second connection point of the flapper.

3. A check valve according to claim 1, wherein the compressible device is a spring or a gas-filled chamber.

4. A check valve according to claim 1, wherein a section of a side wall of the piston is a part of the expandable chamber.

5. A check valve according to claim 1, wherein the valve seat is interchangeable.

6. A check valve according to claim 1, wherein the flapper is pivotally connected at the first connection point by a continuous shaft.

7. A check valve according to claim 1, wherein the valve housing comprises a first and a second element connected together, each element comprising two ends wherein one end has a function suitable for joining the two elements together, said function preferably comprising threads, and the second ends of the elements comprising a flange.

8. A check valve according to claim 7, wherein the compressible device is a spring which is received in a bore that extends in one of said elements into the flange thereof.

9. A check valve according to claim 3, wherein the piston is pivotally connected to the flapper by an arm, said arm being pivotally connected to the second connection point of the flapper.

10. A check valve according to claim 2, wherein the compressible device is a spring or a gas-filled chamber.

11. A check valve according to claim 2, wherein a section of a side wall of the piston is a part of the expandable chamber.

12. A check valve according to claim 2, wherein the valve seat is interchangeable.

13. A check valve according to claim 2, wherein the flapper is pivotally connected at the first connection point by a continuous shaft.

14. A check valve according to claim 2, wherein the valve housing comprises a first and a second element connected together, each element comprising two ends wherein one end has a function suitable for joining the two elements together, said function preferably comprising threads, and the second ends of the elements comprising a flange.

15. A check valve according to claim 14, wherein the compressible device is a spring which is received in a bore that extends in one of said elements into the flange thereof.

16. A system comprising: valve,
a flow valve;
a hydraulically overrideable check valve; and
a cementing unit on a surface test tree,
wherein the hydraulically overrideable check valve is situated in between the flow valve and the cementing unit, and
wherein the hydraulically overrideable check valve comprises a valve housing, a substantially circular flapper, a valve seat for the flapper, an expandable chamber in fluid contact with a connecting port for hydraulics fluid, and a piston having a first and a second end, wherein the flapper comprises a first and a second connection point and is pivotally connected at the first connection point, said flapper being capable of pivoting between a closed position in close contact with the valve seat and an open position which allows fluid to flow through the valve, and wherein the piston is in contact with the expandable chamber and a pre-stressed compressible device, said piston being pivotally connected at the first end to the flapper via the second connection point, characterized in that the compressible device can move the piston in a direction towards the valve seat, that hydraulic fluid can move the piston in a direction away from the valve seat when sufficient hydraulic fluid is supplied through the connection port to expand the chamber, and that the second connection point is situated closer to the center of the circular part of the flapper than the first connection point, such that the flapper comes into close contact with the valve seat when the piston is moved in a direction towards said valve seat and the flapper will pivot around the first connection point in a direction towards the piston when the piston is moved in a direction away from the valve seat.

17. The system according to claim 16, wherein the piston is pivotally connected to the flapper by an arm, said arm being pivotally connected to the second connection point of the flapper.

* * * * *